A. SUNDH.
MULTIPLE UNIT POWER TRANSMISSION MECHANISM.
APPLICATION FILED APR. 3, 1909.
1,055,569.
Patented Mar. 11, 1913.
7 SHEETS—SHEET 2.
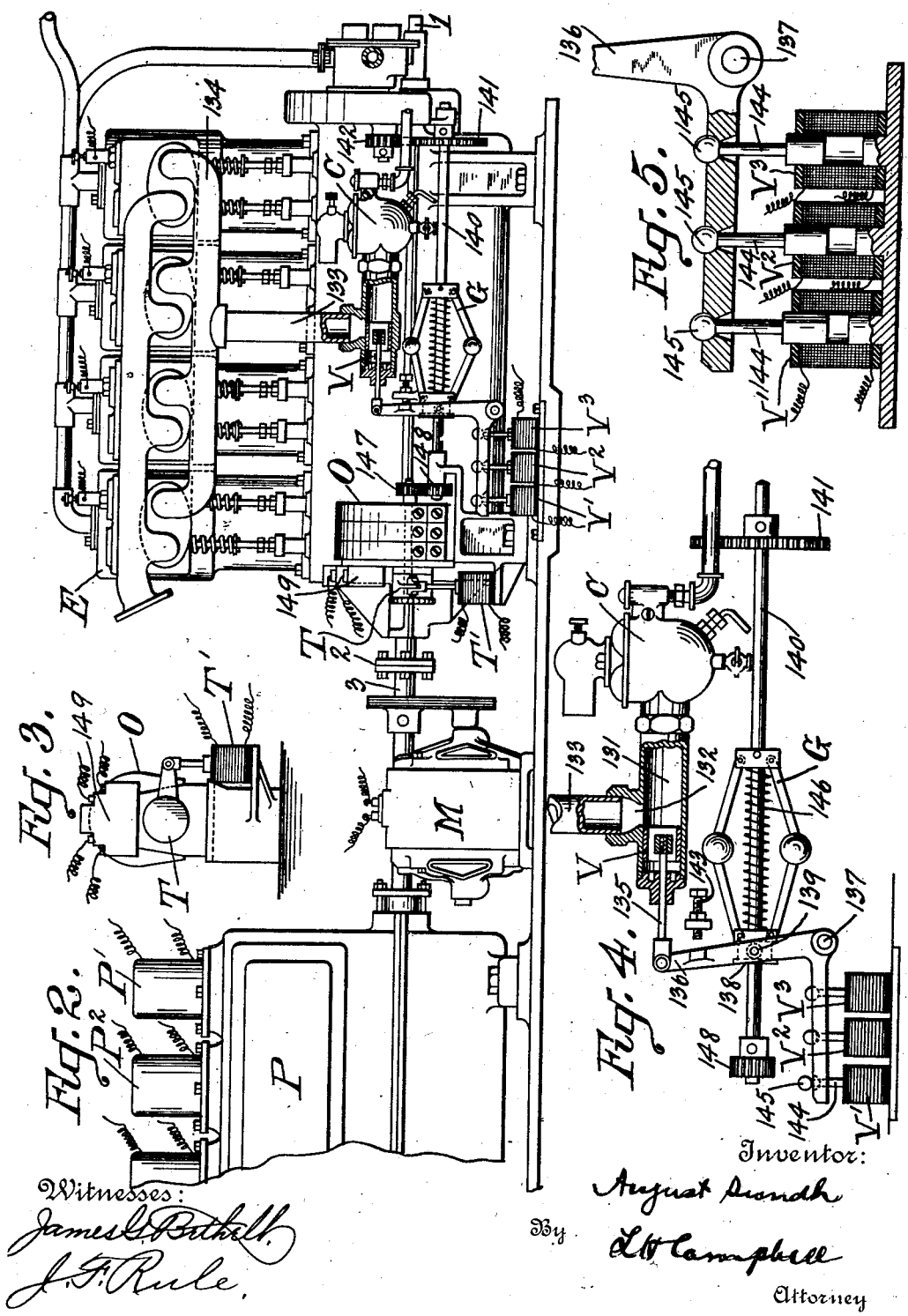
Witnesses:
James G. Buthell.
J. F. Rule.
Inventor:
August Sundh
By L. H. Campbell
Attorney

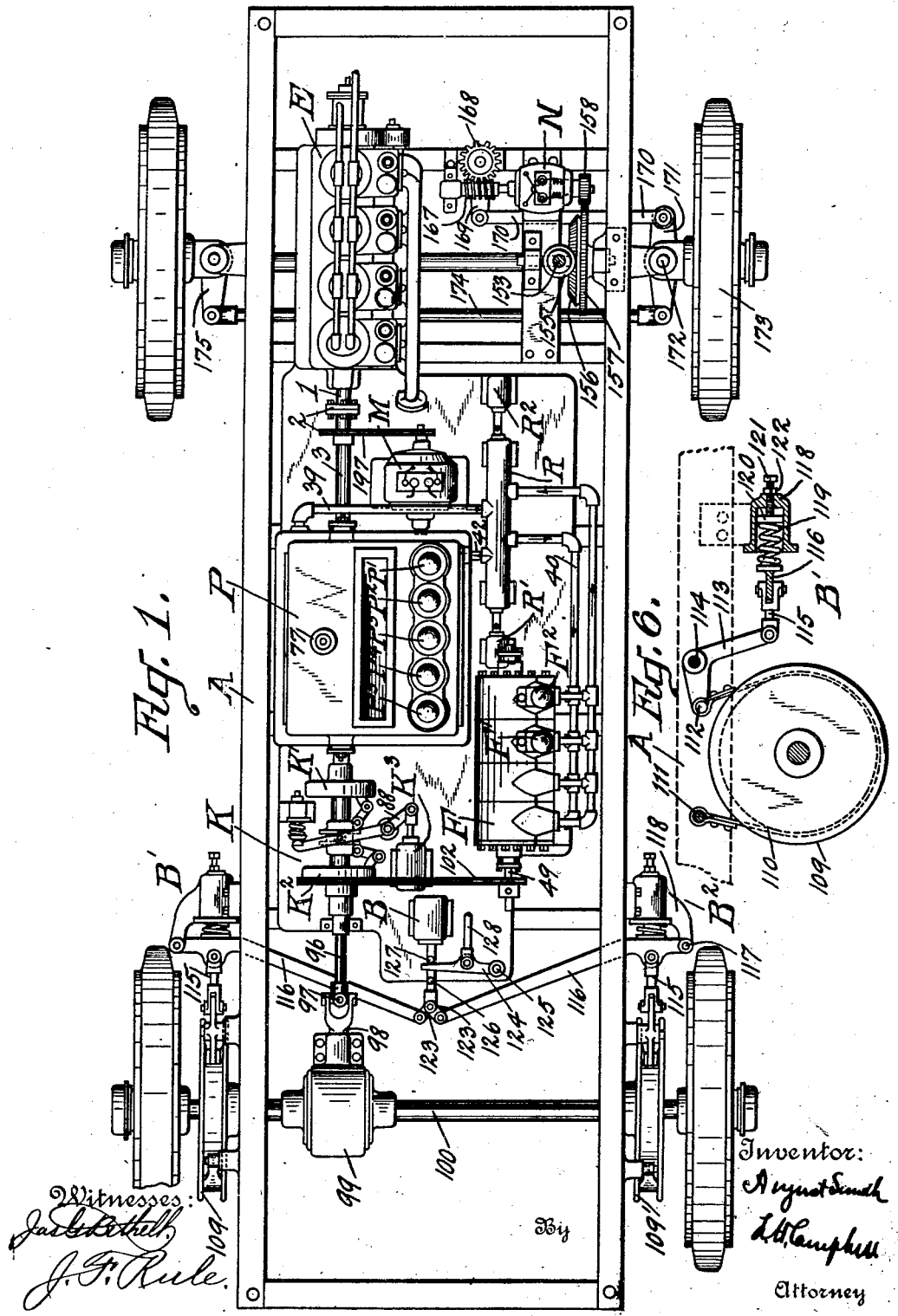

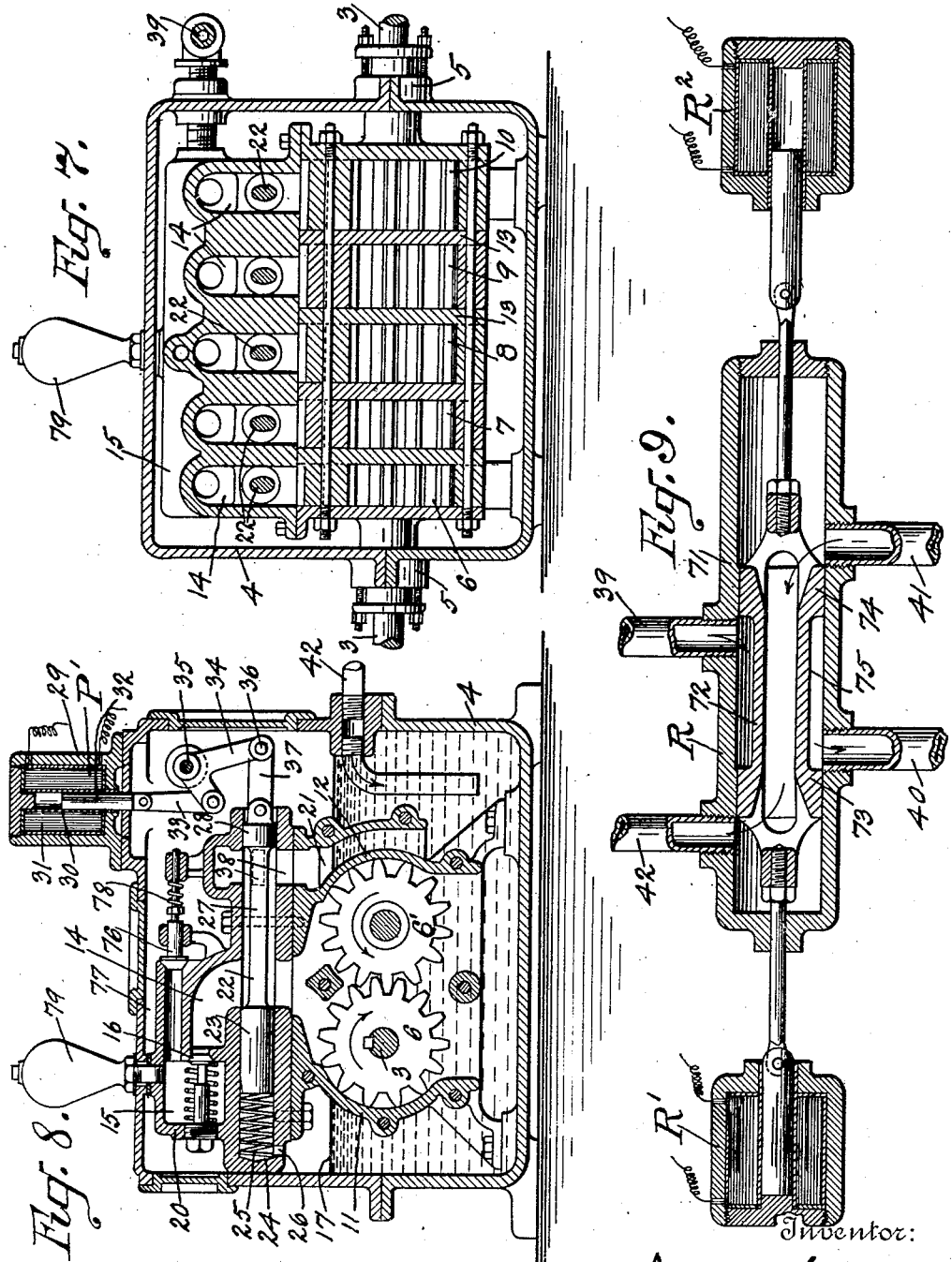

A. SUNDH.
MULTIPLE UNIT POWER TRANSMISSION MECHANISM.
APPLICATION FILED APR. 3, 1909.
1,055,569.
Patented Mar. 11, 1913.
7 SHEETS—SHEET 4.
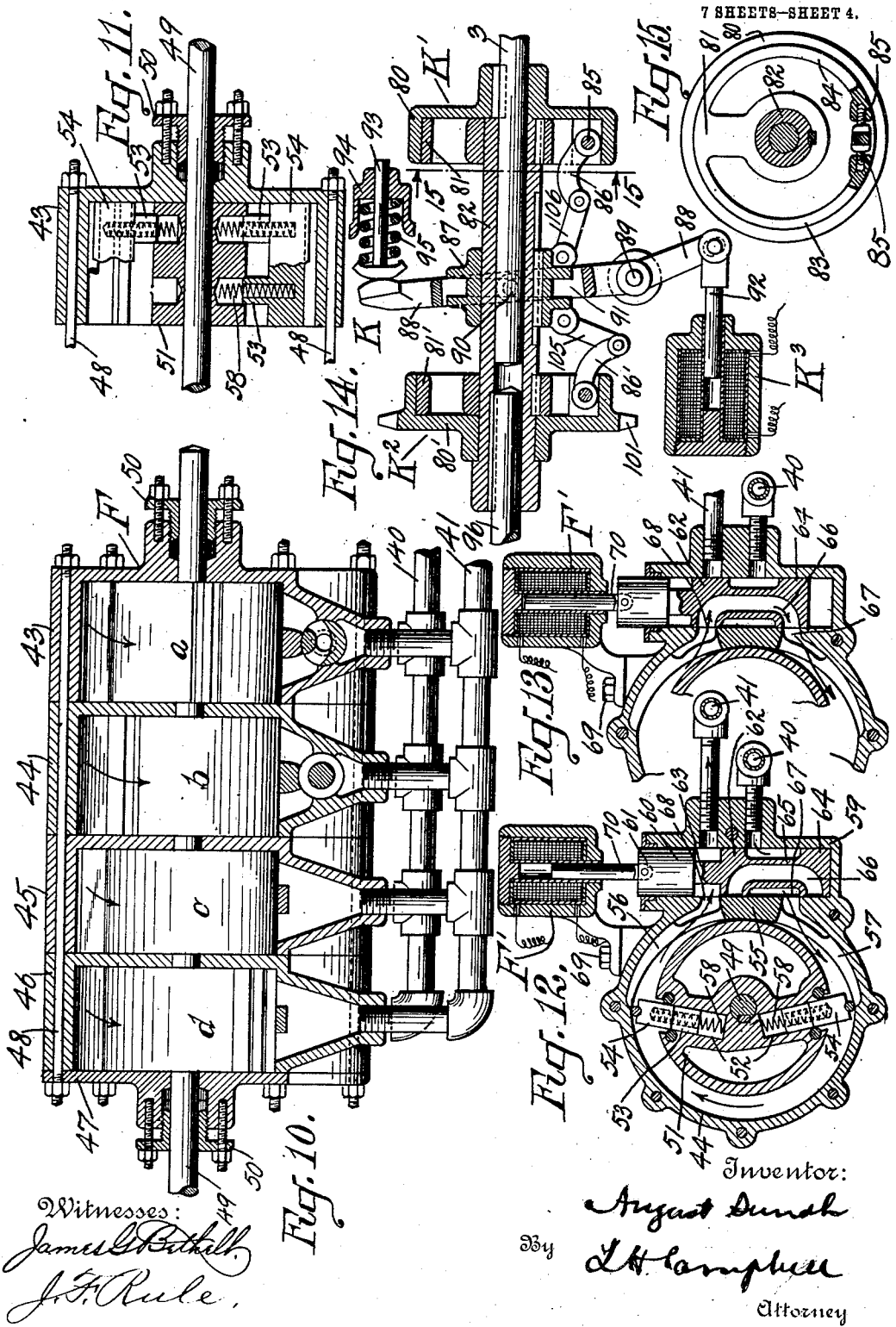
Witnesses:
James L. Bithell
J. F. Rule
Inventor:
August Sundh
By L. H. Campbell
Attorney

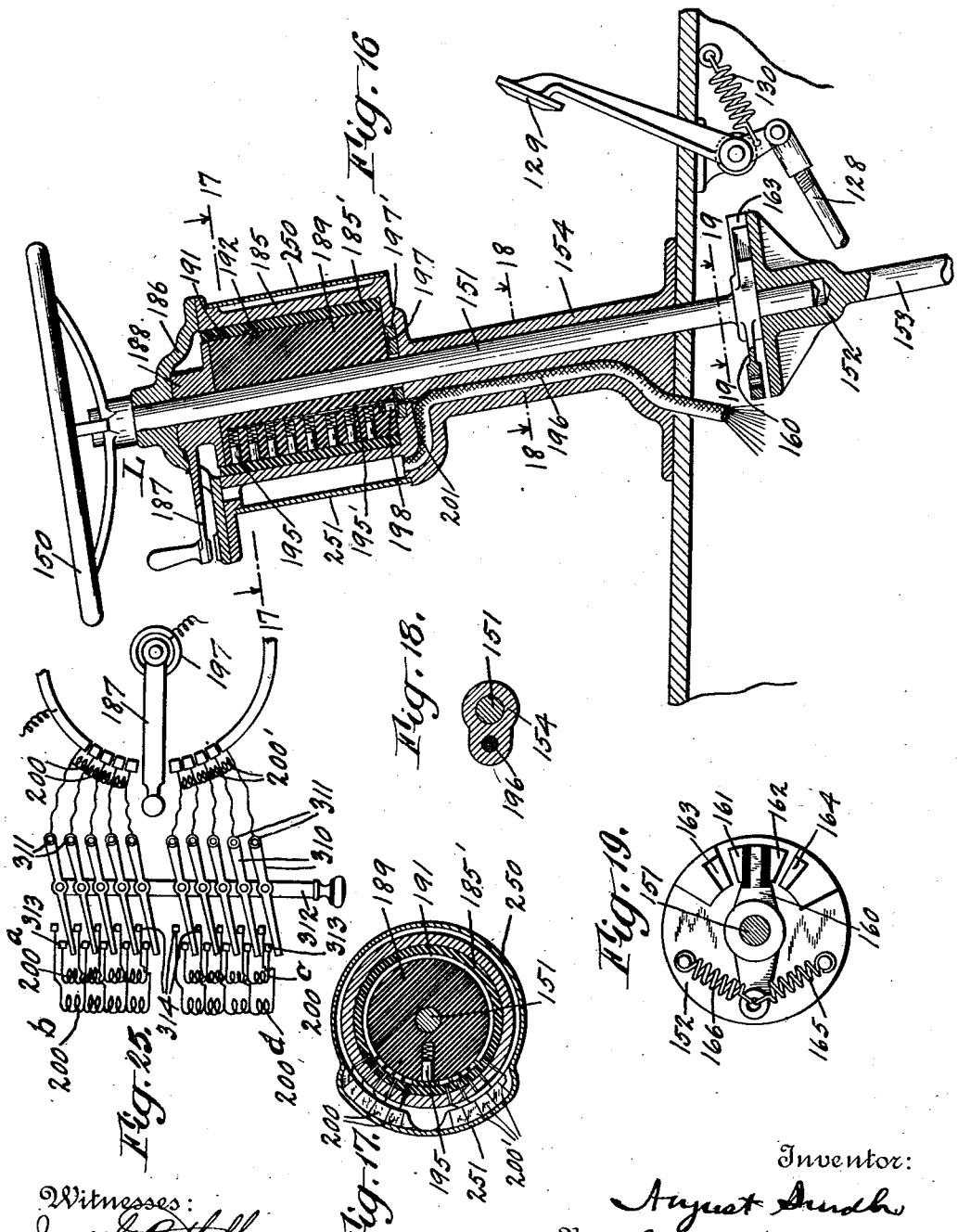

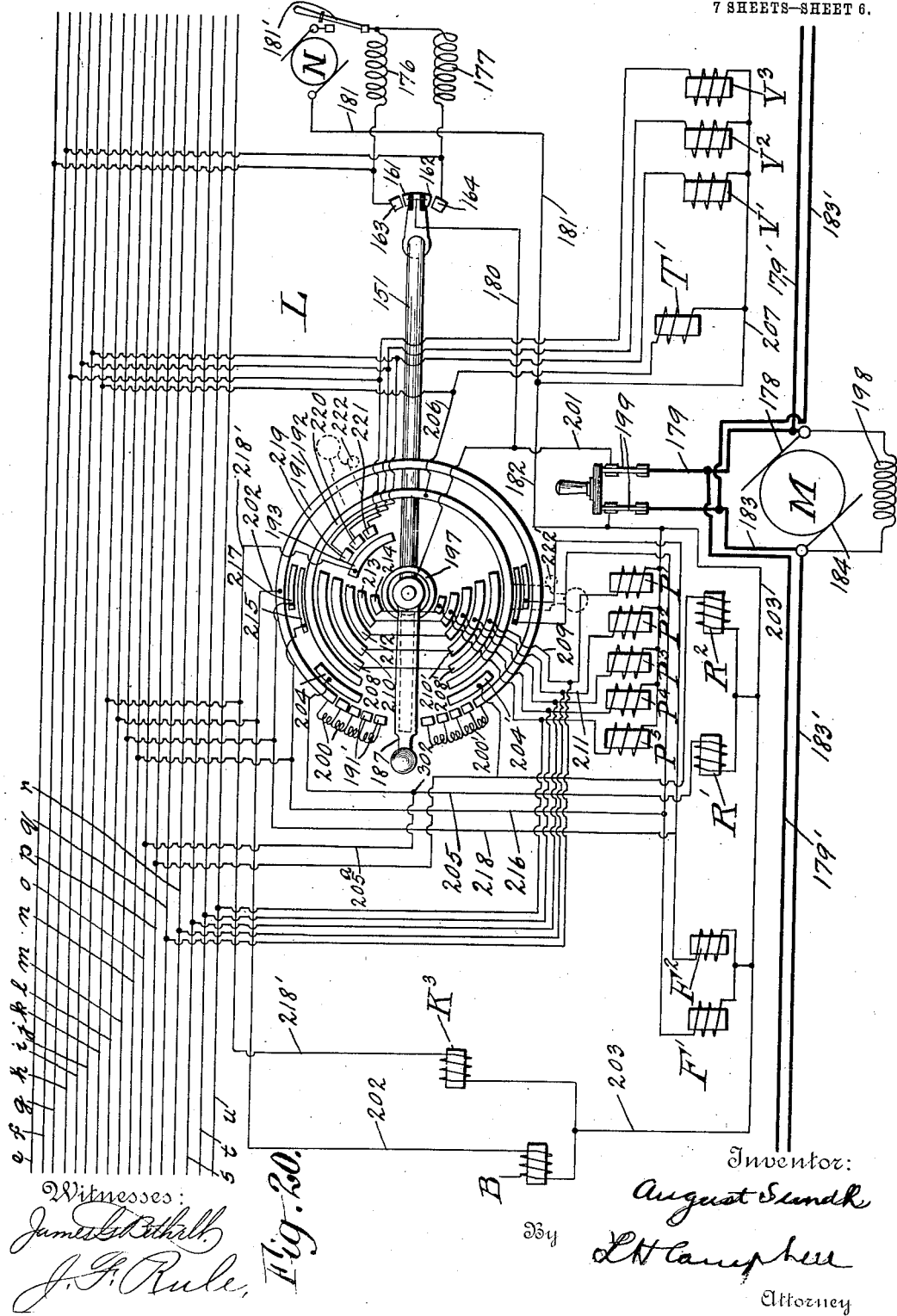

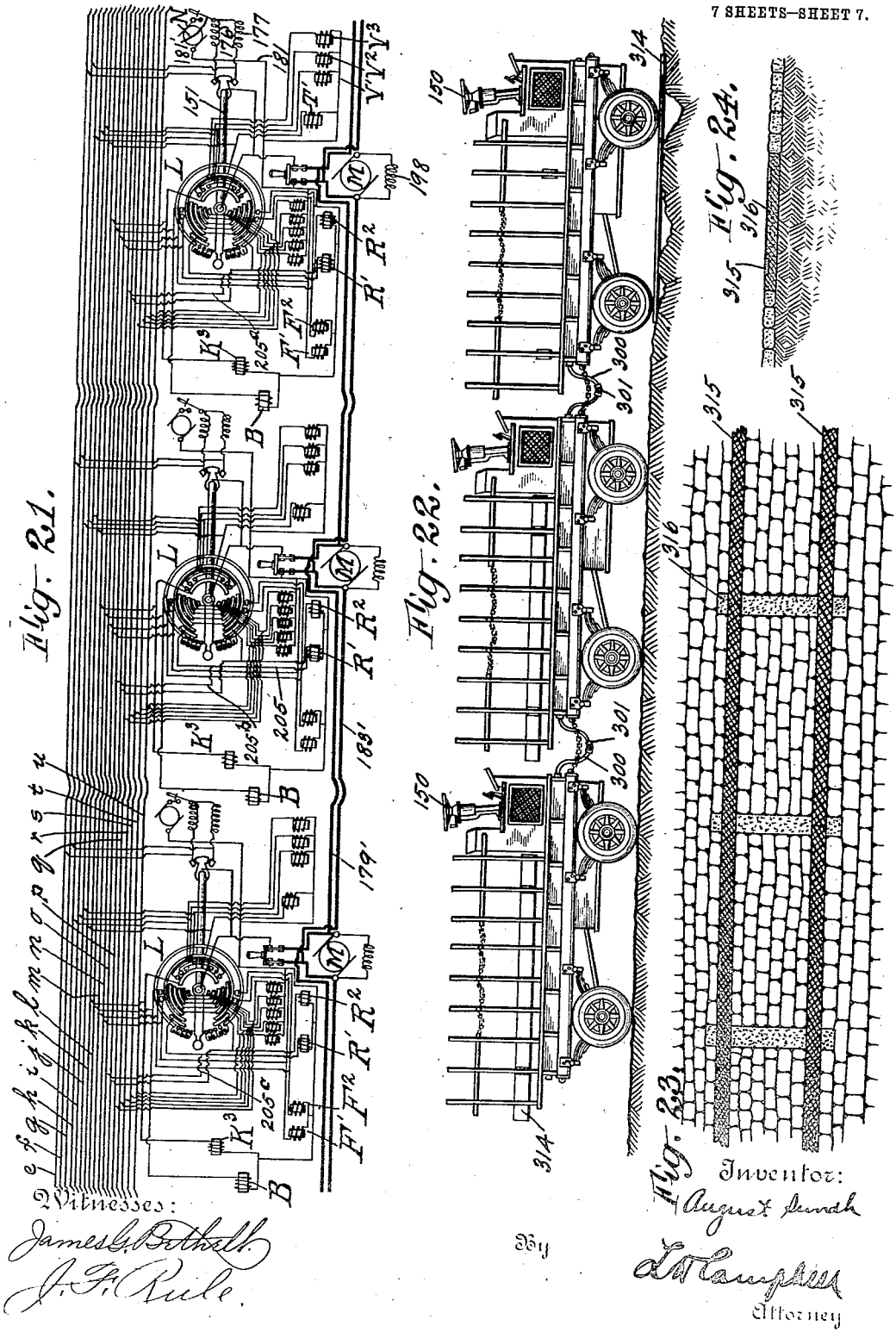

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

MULTIPLE-UNIT POWER-TRANSMISSION MECHANISM.

1,055,569.  Specification of Letters Patent.  Patented Mar. 11, 1913.

Application filed April 3, 1909. Serial No. 487,700.

*To all whom it may concern:*

Be it known that I, AUGUST SUNDH, a citizen of the United States, residing at Yonkers, in the county of Westchester and State of New York, have invented a new and useful Improvement in Multiple-Unit Power-Transmission Mechanism, of which the following is a specification.

My invention relates to a multiple system of electrical control for a plurality of power transmission units, and is particularly adapted for use on trains of cars, automobiles, trucks, etc., in which a plurality of cars or units are each equipped with independently operative mechanism for driving the same, and connected together to form a train adapted to be controlled by one operator.

The invention comprises cars or vehicles each provided with an internal combustion engine used as a prime mover, and fluid operated variable speed gears or power transmission mechanism interposed between the prime mover and the driving wheels of the vehicle, together with means for controlling each power unit independently or all together from a single point.

This application discloses subject-matter disclosed and claimed in my co-pending application for patent on electro-magnetically controlled power transmission mechanism, filed March 6, 1909, Serial No. 481,839.

One of the objects of the present invention is to make it possible and practical to use internal combustion engines as a substitute for the electric motors now in use for multiple unit service on railroads, etc., and thereby avoid various objections incident to the use of electric motors, as, for example, the great expense both of equipment and operation, the use of heavy storage batteries, etc.

Other objects of the invention will appear hereinafter, the scope of the invention being defined by the appended claims in which are set forth the novel combinations of elements.

The exact nature of the invention will be better understood from a description thereof in connection with the accompanying drawings which illustrate a construction embodying one form of my invention, as applied to a train of automobile trucks.

Figure 1 is a plan view of an automobile truck equipped with an internal combustion engine, and fluid power transmitting mechanism; Fig. 2 is a part sectional elevation of the internal combustion engine and controlling mechanism associated therewith, and also showing an electric generator and a portion of the pump; Fig. 3 is a detail view showing a magneto and a timer and distributer used in the control of the engine; Fig. 4 is a detail view showing a valve controlling the supply of fuel to the engine and controlling mechanism associated therewith; Fig. 5 is an enlarged detail of the controlling magnets shown in Fig. 4; Fig. 6 is a detail view of the brake mechanism; Fig. 7 is a sectional elevation of the pump; Fig. 8 is a sectional end elevation of the same, and also shows the construction of the valve mechanism controlling the circulation of fluid through the pump; Fig. 9 is a sectional view of the reversing valve and means for operating the same; Fig. 10 is a part sectional plan view of the fluid motor; Fig. 11 is a sectional view through one of the sections of said fluid motor; Fig. 12 is a sectional end elevation of the fluid motor and valve mechanism for controlling the circulation of fluid therethrough; Fig. 13 is a fragmentary view of the same, but showing the valve in a different position; Fig. 14 is a sectional view of the clutch mechanism; Fig. 15 is a section taken on the line 15—15 of Fig. 14; Fig. 16 is a sectional elevation of the steering apparatus and the electric controller; Figs. 17, 18 and 19 are sectional detail views taken on the lines 17—17, 18—18, and 19—19, respectively of Fig. 16; Fig. 20 is a diagrammatic view of the controlling devices and electric circuits therefor; Fig. 21 is a similar view with the electric circuits for a plurality of units connected together; Fig. 22 is an elevation view of a train of automobile trucks; Figs. 23 and 24 are a plan view and a cross-sectional view, respectively, of a section of road bed; Fig. 25 is a diagrammatic view showing resistances for the brake magnet circuits.

The mechanical and electrical features for each unit are preferably substantially the same so that a detailed description of one will be sufficient for all. The general arrangement of parts as shown in Fig. 1, comprises a prime mover E, which is preferably an internal combustion engine, a pump P, coupled to the engine to be driven thereby; a fluid motor F adapted to be driven by fluid pressure supplied from the pump; a reversing valve R controlling the direction of flow of the fluid through the motor F; gearing connecting the motor F to the driving axle of the automobile; clutch mechanism K adapted to disconnect the motor F and connect the engine E to the driving axle 100 independently of the fluid motor; brake mechanism $B^1$, $B^2$; steering apparatus, and a motor N for operating the same. Electromagnets are employed for operating the valves controlling the pump and the fluid motor, and for operating the reversing valve, the clutch mechanism, brake mechanism, etc., and a small generator M geared to the engine E is adapted to furnish electric current for operating the various electromagnets.

The prime mover E is preferably a high speed internal combustion engine, the same being well adapted for use on automobile trucks, etc., as an engine of this type may be both powerful and light in weight. A high speed engine is well adapted for operating the type of pump herein shown. The engine E together with the transmission mechanism is carried by the frame A of the automobile. The shaft 1 of the engine is connected by a coupling 2 to a shaft 3 of the pump.

Figs. 7 and 8 illustrate a type of gear pump that may be employed. The driving shaft 3 of the pump extends through a casing 4, which contains the pumping mechanism and the valve mechanism controlling the latter. Stuffing boxes 5 of any preferred form may be employed to prevent leakage from the casing. Keyed to shaft 3 is a series of pump gears 6, 7, 8, 9 and 10, each meshing with a corresponding gear such as 6'. Each pair of gears is located in a separate compartment having end walls 11 and 12 curved to conform to the peripheries of the gear wheels as shown in Fig. 8. These several compartments are separated by the partitions or walls 13. Located above the pump gears is a casing 20 provided with a series of passages 14 communicating with the several compartments in which the gears are located. These passages 14 open into a pressure chamber 15 formed in the casing 20 and extending substantially the entire length of said casing. The circulating fluid 17 is preferably a light oil which has been found to be well adapted for use with this mechanism, and serves to lubricate the various parts. If desired, however, water or other liquid may be used. A spring pressed check valve 16 is provided for each passage 14, and serves to prevent the liquid from flowing backward toward the pump from the pressure chamber. Extending from each passage 14 is a by-pass 21 communicating with the intake side of the pump. Each of these by-passes is controlled by a balanced valve 22. This valve comprises the cylindrical portion 23, slidable in a recess 24, formed in the casing 20. The coil spring 25 holds the valve in its outward position as shown in Fig. 8, and a vent 26 serves to relieve the pressure behind the valve. The stem 27 of the valve extends through a cylindrical passage connecting the by-pass 21 with the passage 14, and at the right-hand end of the valve stem is a cylindrical head or piston 28 which serves, when the valve is moved, to the left, to close the by-pass 21.

An electromagnet P' is adapted to operate the valve 22. This magnet may be of any preferred construction. It is here shown comprising an outer casing of magnetic material, such as soft iron, and a central tube 30 on which is wound the magnet coil 31. The armature or core 32 of the magnet is adapted to be drawn up in the tube 30 when the magnet is energized.

The various electromagnets used in the present invention, and as herein shown, are substantially like the one just described. The size and form of the magnets may be varied to secure the best results with the particular devices they are used to operate. It is to be understood also, that other forms of magnets may be used if desired. The core 32 of the magnet P' is connected by a link 33 to one arm of a bell-crank lever 34 pivoted at 35, the other arm of said lever being pivoted at 36 to a link 37, connecting said lever with the valve stem. When the electromagnet P' is excited its core is drawn up, and, through the connections just described, moves the valve toward the left and closes the valve ports 38, thereby cutting off the circulation of fluid through the by-pass. This movement of the valve compresses the spring 25, which, when the magnet is deënergized, serves together with the weight of the core 32 to return the valve to its open position. The weight of the core 32 may be made sufficient to open the valve, in which case the spring 25 can be omitted. It is to be understood that valve mechanism like that just described is provided for each pair of pump gears. The magnets for operating these valves are designated $P^1$, $P^2$, $P^3$, $P^4$, and $P^5$, respectively, and are adapted to be successively energized as will be fully described hereinafter.

The liquid is conveyed from the pressure chamber 15 through pipe 39 and to the reversing valve R. The latter is in communication with the fluid motor F through the pipes 40 and 41. The liquid after circulating through the motor F is returned to the reversing valve R, and from thence through a pipe 42 to the discharge chamber formed by the casing 4 of the pump. In order to prevent excessive pressure in the pressure chamber 15 from any cause, a relief valve 76 is provided. This valve normally closes a passage 77 leading from the pressure chamber and opening into the exhaust chamber 4. An adjustable spring 78 serves to hold the valve normally closed, and may be adjusted to permit the valve to open whenever the pressure in the chamber 15 exceeds any predetermined limit. An air chamber 79 is located above and opens into the pressure chamber, and serves as a cushioning device to prevent any sudden changes in the pressure of the liquid, thereby insuring a smooth action of the parts, and preventing any sudden strain on the mechanism. This air chamber also serves to receive any air bubbles that may be drawn into the liquid by the pump.

The construction of the fluid motor F and the valve mechanism controlling the circulation of fluid therethrough is shown in detail in Figs. 10, 11, 12 and 13. The casing of the motor, as here shown, comprises four sections, 43, 44, 45 and 46, and an end plate 47, bolted together by bolts 48, and forming four compartments, $a$, $b$, $c$, and $d$. The driving shaft 49 extends longitudinally through the casing, and stuffing boxes 50 are provided to prevent leakage. In each of the compartments $a$, $b$, $c$ and $d$ is located a rotary driving member 51 keyed to the shaft 49. The construction of these rotary driving members is well known in the art, and need only be briefly described. The member 51 is provided with recesses 52 in which are slidable stems 53 secured to blades 54, which latter project beyond the cylindrical portion of the member 51, but are movable inwardly to a position within the periphery of said cylindrical portion. The casing within which the member 51 rotates is substantially circular in cross-section, as seen in Fig. 12. A section 55 of the casing lies in close proximity to the rotary member 51. Curved guides 56 and 57 extend from the part 55 to the upper and lower portions of the casing, respectively. The guide 56 serves to move the blade 54 gradually inwardly as it moves from its uppermost position to the right hand side of the casing, and permits it to be gradually extended outwardly as the blade moves toward its lowermost position. Springs 58 serve to hold the blades outward at all times as far as the casing or said parts 56 and 57 will permit. Formed on a section 44 of the motor F is a valve casing 59, in which is adapted to reciprocate a balanced valve 60. This valve comprises an upper cylindrical portion 61, an intermediate portion 62, and stem 63 connecting said portions; also portion 64 and a stem or reduced portion 65 connecting the portions 62 and 64. A passage 66 is formed through the stem 65. The pipes 40 and 41 extend from the reversing valve R to the valve casing 59. When the valve 60 is in the position shown in Fig. 12, fluid under pressure is conveyed from the pump through the pipe 40, enters the valve casing 59 and circulates around the valve stem 65 and through the port 67 in to the casing 44. The pressure of the liquid against the blade 54 rotates the member 51. The liquid in front of the upper blade 54 is forced through the port around the valve stem 63, into the pipe 41, and back to the reversing valve and pump. The member 51 is thus rotated to drive the shaft 49.

An electromagnet F' which may be secured to the pump casing by bolts 69, is adapted to operate the valve 60. The core 70 of the magnet is connected to the valve 60 and when the magnet is energized, lifts the valve from the position shown in Fig. 12, to the position shown in Fig. 13. In this position the passage 66 formed through the valve establishes direct communication between the intake port 67 and outlet port 68 of the motor. The part 62 at this time closes the pipe 41 and communicates between the pipe 40 and intake 67 is also cut off. When the magnet F' is excited therefore, fluid is permitted to circulate freely within the section 44 of the motor, and through the passage 66, without exerting any driving action on the motor. Similar valve mechanism is provided from the section 43 and adapted to be operated by magnet F². The fluid motor F may have any desired number of sections, and valve mechanism may be applied to as many of these sections as desired. The purpose of these valves in connection with the motor is fully set forth hereinafter.

The direction in which the liquid is circulated through the motor F, and consequently the direction in which the latter is rotated, is controlled by the reversing valve R (see Figs. 1 and 9). The valve R comprises a cylindrical casing 71 in which the valve member 72 is adapted to reciprocate. The part 72 comprises end portions or pistons 73 and 74 connected by a hollow stem 75, permitting the free circulation of the fluid through the member 72. With the valve in the position shown, the liquid from the pressure pipe 39 can circulate around the stem 75 and into the pipe 40, and from thence to the motor F. The exhaust fluid from the motor F flows through the pipe 41 and through the interior of the valve member 72 to the pipe 42, which leads to the exhaust chamber 4. As the valve member 72 is moved to the right the parts 73 and 74 cover the pipes 40 and 41, respectively, and cut off the circulation of fluid through the reversing valve. The continued movement of the member 72 to the right connects the pipe 41 with the pressure pipe 39, the fluid now circulating around the stem 75. The pipe 42 is also connected directly to the pipe 40. The direction in which the liquid circulates through the motor F is therefore reversed, causing a reversal of the motor. Electromagnets R' and R² are adapted to move the valve member 72 to its left and right hand positions, respectively.

Referring to Figs. 1, 14 and 15, the clutch mechanism K which is adapted to connect the driving axle of the machine either to the fluid motor F or to the engine E independently of said motor, will now be described. This clutch mechanism comprises two clutches K¹, K². The clutch K¹ comprises an outer member 80 and an inner member 81. The member 80 is in the form of a flanged disk, and is keyed to the shaft 3 of the pump. A sleeve 82 is loosely mounted on the shaft 3, and extends within the clutch member 80. The inner clutch member 81 is keyed to the sleeve 82, and comprises two resilient arms 83 and 84, adapted to move into and out of frictional engagement with the inner surface of the flange formed on the member 80. A short rod 85 is provided with right and left hand screw threads at its ends engaging correspondingly threaded recesses in the ends of the arms 83 and 84. A crank arm 86 is secured to the rod 85, and adapted to rotate the latter into position to engage and release the clutch members. The clutch K² is similar in construction to the clutch K¹, and comprises outer and inner members 80' and 81'. The member 80' is loosely mounted on the sleeve 82, and the member 81' is keyed to the sleeve 82. The clutch members 80' and 81' are moved into and out of contact by means of the crank arm 86'. The sleeve 87 is splined on the sleeve 82, so as to be movable longitudinally thereof, but is prevented from rotating independently of the sleeve 82. A bifurcated lever 88 pivoted at 89 straddles the sleeve 87, and is provided with pins 90 extending into the annular recess 91 formed in the sleeve 87. One end of the lever 88 has a slot and pin connection with the core 92 of an electromagnet K³. The opposite end of the lever 88 bears against the head of a pin 93, slidable in a cup-shaped bracket or stop 94. A coil spring 95, surrounding the pin 93 and bearing at its opposite ends against the head of the pin and bracket 94, respectively, serves to move the lever 88 into the position shown in Fig. 14, when the magnet K³ is deënergized.

The left hand end of the sleeve 82 is keyed to a shaft 96 extending rearwardly from the clutch mechanism, and connected by a universal coupling 97 to a shaft 98 extending within the gear casing 99 mounted on the rear axle of the machine. The shaft 98 is geared in any suitable manner within the gear casing to the driving axle 100. The member 80' of the clutch K², is formed with sprocket teeth 101. A sprocket chain 102 connects the member 80' with a sprocket pinion on the rear end of the shaft 49 of the fluid motor F.

With the clutch mechanism in the position shown in Figs. 1 and 14, the members of the clutch K² are in frictional engagement, so that when the fluid motor F is operated, the sprocket chain 102 drives the clutch K², thereby rotating the sleeve 82 and the shaft 96, the latter imparting movement to the driving axle 100. The members of the clutch K' at this time are disconnected, so that the pump shaft 3 may rotate freely within the sleeve 82. When the electromagnet K³ is excited its core 93 is drawn inwardly and operates the lever 88, thereby compressing spring 95 and moving the sleeve 87 to the right. This movement of the sleeve 87 operates through the links 105 and 106, to disconnect the members of the clutch K², and connect the members of the clutch K'. The member 80' of the clutch K² can now rotate freely on the sleeve 82, so that no power is transmitted from the axle of the fluid motor F to the driving axle 100. The connection of the members of the clutch K' causes the sleeve 82 to rotate with the pump shaft 3, the sleeve 82 in turn driving the shaft 96, so that the engine E is connected through the pump shaft 3, and shaft 96, with the driving axle. In other words when the clutch magnet K³ is excited the engine E is connected to drive the machine independently of the fluid motor F, and when the clutch magnet is deënergized, the engine can only operate through the liquid circulating in the pump and fluid motor to drive the machine.

The brake mechanism shown in Figs. 1 and 6, will now be described. Secured to the driving axle 100 are brake pulleys 109 and 109'. As the construction of the brake mechanism for each brake pulley is substantially the same the description of one will suffice for both. Referring to Fig. 6, a brake strap 110 is connected at 111 to the frame A of the machine. This brake strap extends around the brake pulley, and its opposite end is connected at 112 to a bell crank lever 113, pivoted at 114. The lower end of the bell crank lever is connected by a link 115 to a lever 116. The outer end of the lever 116 is pivoted at 117 to a bracket 118 bolted to the frame A. This bracket is formed with a cup-shaped member in which is located a coil spring 119, the outer end of which bears against the lever 116. The inner end of the spring 119 bears against the stop 120 in the bracket 118. A set screw 121 serves to adjust the position of the stop 120, and thereby adjust the tension of the spring. A set nut 122 may be provided to hold the set screw in its adjusted position. As shown in Fig. 1, the levers 116 are connected to the core of an electromagnet B by means of links 123. When the magnet B is deënergized the springs 119 exert a pressure on the levers 116 which is transmitted through the links 115 and bell crank levers 113, and serves to hold the brake straps applied to the brake pulleys. When the brake magnet B is excited it operates to draw the inner ends of the levers 116 forward, compressing the brake springs 119, and moving the bell crank levers into position to release the brake straps from the brake pulleys. A device for manually applying the brakes independently of the brake magnet is also provided. This device comprises a lever 124 pivoted at 125. The free end of the lever extends between pins 126 and 127 carried by the core of the brake magnet. A link 128 is pivoted to the lever 124 and extends to the forward part of the machine as shown in Fig. 16. The forward end of this link is connected to a foot lever 129, located in any convenient position for operation.

A coil spring 130 connected to the foot lever serves to hold it normally in its upper position. The pins 126 and 127 are so located with respect to the lever 124 that the core of the brake magnet B may be moved in or out without disturbing the foot lever 129. When the foot lever is depressed the lever 124 will exert pressure against the pin 126, and serve to apply the brakes. If the brake magnet is at this time deënergized, and the brakes are already applied, the braking action may be increased by pressure on the foot lever. The latter may also be operated in opposition to the brake magnet if desired, as for example, in case of an emergency, when it is desired to quickly apply the brakes.

By reference to Figs. 2, 4, and 5, it will be seen that the supply of fuel transmitted through the carbureter C to the combustion chambers of the engine, is regulated and controlled by the valve V. The carbureted fuel passes from the carbureter through pipe 131, port 132, and vertical pipe 133, to the horizontal pipe 134, which distributes the fuel to the combustion chambers of the engine. The valve V may be moved over the port 132 to a greater or less extent, to correspondingly restrict the passage of the fuel therethrough. The valve stem 135 is connected to a bell crank lever 136, pivoted at 137 to a stationary support. A centrifugal governor G, which as here shown, is of a well known construction, comprises a sleeve 138 for operating the bell crank lever 136 by means of a pin 139 carried by the lever, and engaging the sleeve 138. The governor is carried by a shaft 140, to which is keyed a gear wheel 141, meshing with a pinion 142, geared in any convenient manner to the shaft 1 of the engine. The governor is therefore operated in a well understood manner to move the valve V into positions corresponding to the speed of the engine E. An adjustable stop 143 in the path of movement of the bell crank lever serves to limit the inward movement of the valve so that the governor G cannot operate to entirely cut off the supply of fuel. Additional mechanism for controlling the valve V comprises a series of electromagnets V', V² and V³. The cores of these magnets are each provided with a stem, 144, which extends upward through an opening in the horizontal arm of the bell crank lever and is formed at its upper end with a knob 145. When the valve V is in its forward position, with the bell crank lever bearing against the stop 143, the cores of the electromagnets are held in their upper position as shown in Fig. 5. The electromagnets are adapted to be energized successively to operate the lever. When the electromagnet V' is excited, its core is drawn downward and moves the lever a certain distance about its pivot 137. This movement permits the cores of the magnets V² and V³ to drop a shorter distance than the core of the magnet V', owing to their position relative to the pivot of the lever. The magnet V² is next excited, and produces an additional movement of the bell crank lever. Finally the magnet V³ is energized, and its core pulled downward to move the valve V to entirely open the port 132. As shown in Fig. 5, the cores of the electromagnets move different distances. The core of the magnet V³ having the greatest length of movement, it thereby increases the angle through which the bell crank lever is rotated. The governor G serves to lift the cores of the electro-magnets when the latter are deënergized.

Referring to Figs. 2 and 3, I have shown a magneto O adapted to furnish current for the sparking coils of the engine R. The shaft of the magneto O is geared to the governor shaft by means of intermeshing gear wheels 147 and 148 secured to the shaft of the magneto, and the governor shaft 140, respectively. The distributer 149 and the spark advancer or timer T may be of any well known or approved construction. An electro-magnet T' is connected to the timer to operate same as will be described later. When the electromagnet T' is excited, the timer is operated into position to advance the sparks, that is, the sparks in the combustion chambers of the engine are each produced slightly in advance of the working stroke of the piston.

The steering mechanism shown in Figs. 1, 16, 17, 18, 19 and 20 will now be described. The steering wheel 150 is secured to the upper end of the steering shaft 151, journaled in the standard 154. The lower end of the shaft 151 extends into, and is rotatable in, a cup-shaped member 152, formed on the upper end of a shaft 153. Secured to the shaft 151 immediately above the member 152 is a switch lever 160. This switch lever carries two insulated contacts 161 and 162 movable into engagement with the switch contacts 163 and 164, respectively. The contacts 163 and 164 are carried by, but electrically separated from, the member 152, and also form stops to limit the movement of the switch lever independently of the shaft 153. Centering springs 165 and 166 serve to normally hold the switch lever in an intermediate position with the switch contacts separated. The shaft 153 has secured thereto, as shown in Fig. 1, a beveled pinion 155 meshing with a vertically disposed beveled gear 156. The small electric motor N is provided with a spur pinion 158 on one end of the motor shaft meshing with a spur gear 157 secured to or formed integral with the beveled gear 156. The opposite end of the motor shaft is provided with a worm 167 meshing with a worm gear 168. A crank arm 169 secured to the shaft of the worm gear 168 so as to rotate therewith is connected by a link 170 to a lever 171 secured to a vertical pin 172. The wheel 173 of the automobile is also secured to the pin 172 for rotation therewith about a vertical axis in steering the machine. A rod 174 connects the lever 171 with a crank arm 175 which serves to always maintain the front wheels parallel. The motor N is preferably a series motor, and, as shown in Fig. 20, is provided with two oppositely wound field coils 176 and 177, so that when current is supplied to the motor through one of these coils it will operate in one direction, and when current is supplied through the other field coil the direction of rotation will be reversed. It will be seen that when the motor N is rotated it operates through the worm gear and other connections to move the front wheels of the machine about vertical axes, in a direction depending upon the direction in which the motor is running. The motor at the same time drives the gears 158, 157, 156 and 155 thereby rotating the shaft 153.

The operation of the steering mechanism will be understood from the following description: When the operator desires to change the course of the machine he rotates the steering wheel 150 to the left, for example, to bring the contacts 161 and 163 into engagement, and thereby completes a circuit from the generator M, through the motor N. This circuit may be traced from the brush 178, through conductors 179, 201 and 180, switch contacts 161 and 163, field coil 176, switch 181' through the armature of the motor N, and through conductors 181, 182 and 183 to the opposite brush 184 of the generator M. The motor N therefore receives current and operates as above described, to turn the front wheels of the machine. The shaft 153 is rotated at the same time so that the contacts 161 and 163 will again be separated, unless the operator continues to rotate the steering wheel to follow the shaft 153. As long as sufficient turning power is exerted at the steering wheel to keep the contacts 161 and 163 in engagement, the motor N will continue to rotate, and as soon as the steering wheel is stopped the circuit will be opened and the motor stopped. It will thus be seen that the operator can steer the machine by exerting only sufficient power to rotate the shaft 151 and keep the switch contacts in engagement. By turning the steering wheel in the reverse direction, the contacts 162 and 164 will be brought in engagement to supply current to the motor through the field coil 177, and thereby operate the motor in the reverse direction. If the motor N should at any time be out of order, the steering mechanism may be operated manually. In this case when the operator rotates the steering wheel, the switch arm 160 serves to drive the shaft 153, and therefore the gearing shown in Fig. 1 drives the motor by manual power, the motor operating in turn as when electrically driven to steer the machine.

Associated with the steering apparatus is the manually operable electric controller L, which, as shown diagrammatically in Fig. 20 is adapted to control the electric circuits for the various electromagnets used in connection with the present invention. As shown in Fig. 16, the upper end of the standard 154 has secured thereto, or formed integral therewith, a casing or box 185 for the controller. A cover 186 for this controller box, forms a bearing for the steering wheel and shaft. Within the controller box 185 is secured a stationary cylindrical sleeve 185'. A series of arc-shaped electrical contacts 191, 192, etc., are secured in this insulating sleeve, with their inner surfaces flush with the inner surface of the sleeve. Mounted for rotation about the shaft 151 is a cylindrical block 189 of insulating material rotatable within the sleeve 185'. This cylindrical block 189 may be rotated by means of the controller lever 187 which has a hub 188 surrounding the shaft 151, and secured to the insulating block. A series of movable contacts, which are preferably in the form of small cylindrical blocks 195, of carbon or other electrical conducting material, are supported in recesses formed in the insulating block 189, and are yieldingly held by means of coil springs with their outer faces bearing against the insulating sleeve 185' or the contacts carried thereby. The contacts 195 are all electrically connected together by a conductor 195' connected to a spring-pressed contact 198 located in the lower end of the block 189. The contact 198 bears, at all times, against a stationary ring 197 of conducting material located in the lower end of the controller box, and insulated therefrom by a ring 197' of insulating material. Surrounding the controller box is an outer sheath or casing 250, which has an enlarged portion 251 forming a space in which are located sections 200 and 200' of resistance material. These resistances are connected in series in the circuit for the electromagnet B controlling the brake mechanism. A cable 196 carrying a plurality of insulated conductors extends upward through the standard 154, and the conductors are connected respectively to the several arc-shaped contacts 191, 192, etc., one of said conductors 201 being connected to the contact ring 197. It will be seen that with the above-described construction, when the controller lever 187 is rotated in either direction the contacts 195 will be carried into engagement with the stationary contact strips in the sleeve 185'. The period at which each stationary contact is engaged by a contact 195 when the controller lever is operated, depends, of course, upon the position of the stationary contact. The position, location, and size of the various contacts will readily be understood from a consideration of the diagrammatic illustration in Fig. 20. In this figure the contacts are shown as concentrically arranged for the sake of clearness of illustration. The principle of operation, however, is the same as with the actual construction employed, and will be readily understood from the diagrammatic view.

A small electric generator M is provided for each truck or unit to supply current for operating the various electromagnets for said unit. This generator may be located in any convenient position, and is connected in any suitable way to the engine E, so that the generator M is running whenever the engine E is in operation. As shown in Fig. 1, a driving belt or chain 197 connects the generator with the shaft 3. This generator, as shown in Fig. 20, is a shunt-wound machine having a shunt field coil 198. A switch 199 may be provided to disconnect the generator from the various circuits leading therefrom whenever desired.

Fig. 20 shows diagrammatically the system of electrical circuits for a single automobile truck. When a number of trucks are connected to form a train, the circuits are connected as shown in Fig. 21. The system of circuits will first be described in connection with the operation of a single machine, which is substantially as follows:—Assuming that the controller lever 187 is in its central position as shown, and that the engine E has been started, the speed of the engine will be normal, controlled by the governor G. The pump shaft 3 being connected to the engine shaft, the pump will be running with the valve mechanism in the position shown in Fig. 8, so that there is a free circulation of the liquid within the pump, and no pressure is transmitted to the fluid motor F. The latter is therefore at rest. The clutch mechanism is also in the position shown, so that no power is transmitted directly from the pump shaft to the driving axle; the brakes also are applied at this time. If the operating lever of the controller or master switch is now moved, for example in a clockwise direction as viewed in Fig. 20, it will first engage successively a series of contacts 191' connected by resistance coils 200. This establishes a circuit from the generator M through the brake magnet coil as follows:— From the commutator brush 178, through the conductor 179, switch 199, conductor 201, contact ring 197, switch lever 187, contacts 191', resistance coils 200, contact segment 191, conductor 202, coil of the brake magnet B, conductor 203, switch 199, and conductor 183 to the other brush 184. The brake coil will now receive current which is reduced by the resistance 200, so that the brakes are only partially released. As the resistance 200 is gradually cut out of circuit, the brake magnet B receives a heavier current and becomes energized sufficiently to entirely release the brakes. The controller lever next engages a contact segment 204, and establishes a circuit through the winding of the electromagnet R'. As all the circuits through the controller may be traced from the brush 178 through the conductors 179 and 201 to the ring 197 and controller lever, these circuits need only be traced from said lever to the brush 184. The circuit for the magnet R' continues from the controller lever through contacts 204, wire 205, coil of electromagnet R', to the conductor 203, and from thence to the brush 184. The electromagnet R' now receives current and moves the reversing valve to the left-hand position as shown in Fig. 9. The controller lever next engages the contact strip 192, and completes the circuit through said contact strip, conductor 206, coil of electromagnet T' and conductors 207, 182 and 183 to the brush 184. The electromagnet T' now operates the timer T. The controller lever next engages the contact strip 208, and establishes a circuit which may be traced through the contacts 208, 208', conductor 209, coil of the electro-magnet P', and from thence to the brush 184. The electromagnet P' now operates as before described in connection with Fig. 8 to close the by-pass for the first pair of pump gears 6 and 6', so that the latter will operate to force the liquid through the passage 14 and past the check valve 16 into the pressure chamber 15, thereby producing pressure in said chamber. The liquid 17 is therefore forced through the pipe 39, reversing valve and pipe 40 to the motor, and is distributed to the several sections *a*, *b*, *c* and *d*, of the motor. The liquid under pressure operates the motor as before described, the exhaust fluid being conveyed back to the pump through the pipe 41, reversing valve R and pipe 42, and discharges from the latter into the discharge chamber of the pump. As the liquid at this time circulates only through the first compartment of the pump, only a small amount will be conveyed to the motor F, and as this liquid is distributed in parallel to the four sections of the motor, the latter will only operate very slowly, so as to start the automobile and run it at its slowest speed. When the controller lever is moved one step farther, the circuit is completed through the contacts 210, and 210′, conductor 211, and winding of electromagnet $P^2$, in parallel with the circuit through the first magnet P′. The magnet $P^2$ operates the valve for the second section of the pump and increases the volume of liquid delivered by the pump, so that the speed of the fluid motor F, and therefore of the automobile, is increased. The continued movement of the controlling lever in like manner brings it into engagement with contacts 212, 213 and 214 and thereby closes the circuits for the electromagnets $P^3$, $P^4$, and $P^5$, successively, to effect the operation of the corresponding pump sections, so that the volume of liquid delivered by the pump is gradually increased, resulting in a corresponding increase in the speed of the machine. The controller lever next engages the contact 215, and establishes a circuit which may be traced from said contact through conductor 216, winding of electromagnet F′, through conductor 203 and from thence to brush 184. The magnet F′ being excited moves the valve 60 from the position shown in Fig. 12 to that shown in Fig. 13, to cut off the supply of fluid to the section *b* of the motor F, as before described, so that all the fluid supplied by the pump is forced to circulate through the sections *a*, *c* and *d*, thereby increasing the speed of the motor F. The controlling lever next engages the contact 217, and completes a circuit through conductor 218, and coil of the magnet $F^2$, the latter operates its valve mechanism to cut off the supply of fluid to the section *a* of the fluid motor, so that the fluid is now all forced to circulate through the sections *c* and *d*. This brings the motor F up to its highest speed. The speed of the shaft 96 driven by the motor F is now substantially the same as that of the pump shaft 3. The controller lever next contacts the segment 193 and thereby establishes a circuit through the conductor 218′ and coil of the clutch magnet $K^3$. The clutch mechanism is therefore operated in the manner already explained to disconnect the fluid motor F, and connect the pump shaft 3 directly with the shaft 96 to drive the machine independently of the motor F. At substantially the same time that the controller lever engages the contact strip 193, to operate the clutch mechanism, it leaves the contacts 208, 210, 212, 213, 214, 215 and 217. The corresponding magnets are therefore deënergized, and the pump valves operated to a position to permit free circulation of fluid within the pump. The valves in the fluid motor are also returned to their initial position. The continued movement of the controller lever closes circuits through the contacts 219, 220 and 221, thereby establishing circuits through the windings of the magnets V′, $V^2$, $V^3$, respectively. These magnets operate to gradually open the valve V to increase the supply of fuel to the motor, thereby increasing the speed of the engine E, and bring the machine up to its highest speed. The controller lever is now in its extreme left-hand position, and is held from further movement by a stop 222.

The speed of the machine may be reduced by moving the controller lever back toward central position, the magnets $V^3$, $V^2$ and V′ being successively deënergized to effect a reduction in the speed of the prime mover. The next step is the deënergization of the clutch magnet, and the operation of the pump and fluid motor valves, whereby the fluid motor is brought into operation at its high speed, and the direct drive from the engine to the driving axle disconnected. As the controller lever moves off the contacts 217 and 215, the electromagnets $F^2$ and $F^1$ are deënergized, and thereby reduce the speed of the fluid motor. The continued movement of the controller lever successively deënergizes the electromagnets $P^5$, $P^4$, $P^3$, $P^2$ and $P^1$, thus gradually cutting off the power supplied to the driving axle. The machine will now be permitted to come to rest. If the lever is moved back to its central position the brake magnet is gradually deënergized to apply the brakes. The controlling lever may be left in any intermediate position to maintain the machine at a corresponding speed. It should be understood that during these controlling operations, the engine E is running continuously, and at a substantially constant speed, except when the speed is increased by the operation of the electromagnets $V^1$, $V^2$ and $V^3$. This arrangement is of great practical importance in securing an efficient operation of the prime mover, and enabling the full power to be utilized in starting the machine, or running the same at a slow speed. The usual annoyance, waste of time, and labor involved in starting the prime mover every time the machine is started is also obviated. The means for permitting the prime mover for each truck to run continuously is of special value when a number of trucks are connected to form a train, in which case it would be impractical to have to start the motors each time the train is started.

If it is desired to run the machine backward, the controlling lever 187 is moved in a counter-clockwise direction, (Fig. 20). The lever first engages the contacts of the brake magnet circuit, and gradually short-circuits the resistance 200' to release the brake mechanism. When the lever engages the contact strip 204' a circuit is established through the electromagnet R², which then operates to move the reversing valve to its right hand position, so that the circulation of the fluid through the motor F will be in the reverse direction. A further movement of the lever 187 in this direction closes circuits through the contacts 208', 210', etc., in the same order as the corresponding contacts are engaged when the controller lever is moved in a direction to accelerate the machine in the forward direction. A stop 222' is provided to limit the movement of the controller lever to the right. Ordinarily the lever 187 need not be moved further to the right than into position to engage the contact 208', or contact 210'.

The relative arrangement of the steering wheel 150 and controlling lever 187 is such that the operator can conveniently steer the machine at the same time that the speed is being changed or controlled. As the motor N may receive current from the generator M, whether the machine is moving fast or slow, ample power is available at all times to operate the steering mechanism.

The foregoing description applies particularly to the control and operation of a single unit. When a plurality of trucks are connected, as shown in Fig. 22, the electrical circuits for the electromagnets or controlling devices are connected in parallel (Fig. 21) by conductors e, f, g, h, i, j, k, l, m, n, o, p, q, r, s, t, u. The motors M may also be connected in parallel by conductors 179' and 183'. These conductors e, f, g, etc., 179' and 183' are carried in cables 300 connected by couplings 301, which may be of any approved construction. With the circuits thus connected, the operation of one controlling lever serves to control all of the machines at once. For example, when the controlling lever on the front truck is moved to engage the contact 204 (Fig. 20) a circuit will be established through the reversing magnet R' of said car as before described. The circuit for the reversing valve magnet R' of the second car branches from the first circuit at the junction 302 and may be traced through conductors 205ª, o, 205ᵇ of the second truck and through the magnet R' of the second truck. The circuit for the magnet R' of the third truck is likewise through the conductors o and 205ᶜ, and to the corresponding magnet R'. The reversing valves will therefore all be operated simultaneously. In like manner each step in the control of the trains is effected simultaneously for all the cars.

The circuits for the motors N controlling the steering apparatus are connected in parallel by the conductors e and f, so that the motors N may be operated simultaneously, but a switch 181' is provided for each motor N, so that the steering apparatus of the front truck alone may be used if desired, the switches 181' on the other trucks being left open.

When the number of units are connected together to be controlled from one point, an arrangement such as shown in Fig. 25 is preferably employed to vary the resistance in the circuits for the brake magnets. Resistances 200ª and 200ᵇ are adapted to be connected in parallel with the resistance 200. Similar resistances 200ᶜ and 200ᵈ may be connected in parallel with the resistance 200'. A plurality of switch levers 310, each having a pivot 311, are connected to an operating rod 312 movable longitudinally to impart a parallel movement to the switch levers. When the rod 312 is moved inward from the position shown the switch levers first engage a series of contacts 313 and thereby connect the resistances 200ª and 200ᶜ in parallel with the resistances 200 and 200'. A further movement of the rod 312 brings the switch levers into engagement with a series of contacts 314 and thereby connects the resistances 200ᵇ and 200ᵈ in parallel with the other resistances. When a single car or unit is in use the resistances 200 and 200' only are in the circuit, the operating rod 312 being in the position shown. When two units are connected for operation the resistances 200ª and 200ᶜ are introduced in parallel with the resistances 200 and 200' in order to reduce the total resistance. This is for the purpose of preventing an increase in the drop in potential through the resistances, owing to the increased current required when the brake magnet coils are connected in parallel. In other words the arrangement provides a means for supplying an equal amount of current to the brake magnet circuits when more than one car or unit is being operated. When three units are connected together the risistances 200ᵇ and 200ᵈ are also introduced, for the same purpose. It will be understood that as many additional sections of resistance may be added and controlled by a single operating rod or lever as desired, the number depending upon the number of units it may be desirable to use in a single train.

As the present invention is adapted for use with trucks which may at times be used on bad roads the trucks could be provided with side bars or irons 314 which may be placed in position for the trucks to run over in crossing bad sections of road or ditches as shown in Fig. 22.

Figs. 23 and 24 show a section of roadbed which is well adapted for use with trucks as employed in the present invention. As shown, tracks formed of flat rails 315 of iron or other suitable material and preferably provided with roughened surfaces are employed. These rails may be supported by sleepers or cross bars 316 made of wood, cement or other suitable material. The rails are flush with the surface of the road or paving so that the wheels of the automobile trucks may readily be run onto or off from the rails.

It will be seen from the foregoing description that the invention comprises a multiple system of electrical control applied to a plurality of units, each of which comprises a vehicle equipped with an internal combustion engine adapted to be run continuously and at practically constant speed while the vehicles are being started, accelerated, stopped or reversed, and provided with power transmission mechanism permitting a variation in the speed and torque of the driving axles. The system is therefore well adapted for use where the variations in the speed and power required are frequent and of considerable extent. For example in going up an incline on a country road considerable power will be required, but only a slow speed is necessary. With the present invention this may be obtained by running the engines or prime movers at a normal speed and therefore efficiently, the speed of the driving axles being reduced by the fluid power transmission mechanism, with but little loss of power in transmission. When a number of cars or trucks are controlled by one operator a uniform traction of the driving wheels for the different trucks is obtained, and there can be no mistakes or irregularities in the control, as will probably occur where each unit is under the control of a separate operator. The advantage of this system for use on country roads will be readily seen. Where the traction of all the trucks is uniform the wear on the road beds and of the wearing surface of the wheels, especially where rubber tires are used will be greatly reduced; much greater loads can also be hauled than where the driving power is confined to one truck, in which latter case the traction would often be insufficient for starting a number of cars or pulling a loaded train up a hill.

The present system also enables the use of a train of cars to be run over any road and permits any one or more of the cars to be disconnected and independently run to some other destination.

The system is also well adapted for use in military operations.

The invention may also be readily adapted for use on ordinary railroads as before indicated. In this case of course the steering apparatus would be omitted and flanged wheels provided. The vehicles would also be modified to meet the requirements for such work.

The present invention might also be adapted for various other uses by such changes and modifications as would be within the skill of the ordinary mechanic, and it is to be further understood that various changes in details of construction and the arrangement of parts might readily be made by those skilled in the art without departing from the spirit and scope of the invention. I wish therefore not to be limited to particular construction herein set forth.

What I claim as new and desire to secure by Letters Patent of the United States is:

1. In a multiple unit controlling system, the combination with a plurality of units each comprising a prime mover, mechanism to be operated and means for transmitting power from the prime mover to said mechanism, of electro-mechanical devices regulating the power transmitting means, and a controller operable to control all of said electro-mechanical devices.

2. The combination with a plurality of power transmission devices, of electro-responsive apparatus for regulating and controlling each of said devices, and means for controlling all of said apparatus from a single point.

3. The combination with a plurality of fluid power transmission mechanisms, of electro-magnetic devices for regulating and controlling said mechanisms, and means for controlling all of said electro-magnetic devices from a single point.

4. The combination with a plurality of fluid power transmission mechanisms, of electro-responsive devices operable to effect the independent control of said mechanisms, and a controller operable manually to effect the simultaneous operation of said electro-responsive devices.

5. The combination with a plurality of prime movers, of mechanisms to be operated thereby, power-transmitting apparatus associated with each of said prime movers, electro-magnets controlling said apparatus, means for supplying electric current to the electro-magnets, and a controller operable to control the supply of current to the electro-magnets.

6. The combination with a plurality of power transmission mechanisms, of an electro-magnetic controlling device associated with each of said mechanisms, means for supplying current in parallel circuits to said electro-magnetic devices, and a master controller operable manually to control the supply of current to said devices.

7. The combination with a plurality of units each comprising a prime mover and power transmitting mechanism associated therewith, of a plurality of successively operable electro-magnetic controlling devices for each unit, circuits for supplying current to said devices, and manually operable means for effecting the synchronous operation of the said devices for the several units.

8. The combination of a plurality of fluid power transmission gears, and an electro-mechanical system of control for effecting the simultaneous operation and control of said gears.

9. The combination with a plurality of fluid power transmission gears, of devices for varying the power and speed of said gears, and a multiple system of electrical control for controlling the operation of said devices.

10. The combination with a plurality of independently operable combustion engines, of driven elements, power transmitting devices forming connections between said engines and driven elements, and a multiple system of the electric control associated with and controlling the operation of said devices.

11. The combination with a plurality of internal combustion engines, of power transmitting devices connected thereto, mechanism operated by said devices, and multiple electrical controlling mechanism manually operable from a single point to control said power transmitting devices.

12. The combination with a plurality of internal combustion engines operable at a practically constant speed, of means operated thereby for generating a current at a practically constant voltage, a plurality of variable speed power transmission devices operated by said engines, and means operated by said current for controlling said power transmission devices.

13. The combination in a plurality of units, of driving members and driven members, fluid operated transmission mechanisms forming driving connections between said members, means for controlling the circulation of fluid within each of said transmission mechanisms and thereby varying the relative speeds of the driving and driven members, electro-magnetic devices for controlling said means, and a controller operable to control all of said devices from a single point.

14. The combination with a plurality of pumps, of a motor associated with each pump and operable by fluid pressure supplied from the pump, valves associated with each pump and operable to vary the volume of fluid delivered by the pumps, electro-magnetic devices for operating the valves, and a controller device controlling the electric circuits for all of said electro-magnetic devices.

15. The combination with a plurality of pumps, of motors operated by fluid delivered by the pumps, balanced valves associated with each pump and motor and operable to vary the volume of fluid delivered by the pumps and thereby vary the speed of the motors, electro-magnetic means for operating the valves, and an electric controlling system comprising a plurality of controlling devices each operable to control the electro-magnetic means for all of said valves.

16. The combination with a plurality of units, each comprising a pump and a fluid motor driven by the pump, of balanced valve mechanism associated with each unit and operable to vary the capacity of the motors, electro-magnetic means for operating the valve mechanism, and a multiple system of electrical control for the electro-magnetic means, and comprising a controller device controlling all of said valve mechanisms.

17. The combination with a plurality of pumps, of fluid motors driven by said pumps, balanced valves associated with each motor and controlling the flow of fluid therethrough, electro-magnetic devices for operating the valves, and means for simultaneously controlling the operation of the valves for the several motors.

18. The combination with a plurality of pumps, of fluid motors driven by the pumps, a plurality of balanced valves associated with each pump and operable to control the passage of fluid therethrough, a plurality of balanced valves associated with each motor and controlling the passage of fluid therethrough an electro-magnetic actuating device for each of said valves, means associated with each pump and motor for effecting the successive actuation of the valves associated with said pump and motor, and a master controller operative to effect a simultaneous operation of corresponding valves.

19. The combination with a plurality of internal combustion engines, of driven members, variable speed gears interposed between the engines and said driven members, and each comprising a pump and a hydraulic motor operated by fluid circulated through the pump and motor, valves controlling the circulation of fluid and operable to vary the volume of fluid supplied by each pump, electro-magnetic devices for operating said valves, and a controller for said electro-magnetic devices.

20. The combination with a plurality of pumps, of fluid motors operated thereby, internal combustion engines connected to operate the pumps and motors, electric generators driven by the engines, means to vary the volume of fluid delivered by the pumps to the motors and thereby effect a variation in the speed and torque of the motors, said means being electro-mechanically controlled and operated by power supplied by the generators, and a controlling device operable to control a supply of electric power to said means.

In testimony whereof, I have signed my name to this specification in the presence of two subscribing witnesses.

AUGUST SUNDH.

Witnesses:
JAMES G. BETHELT,
JOHN F. RULE.